United States Patent
Vashisht et al.

(10) Patent No.: US 10,902,119 B1
(45) Date of Patent: Jan. 26, 2021

(54) DATA EXTRACTION SYSTEM FOR MALWARE ANALYSIS

(71) Applicant: FireEye, Inc., Milpitas, CA (US)

(72) Inventors: Sai Omkar Vashisht, Milpitas, CA (US); Phung-Te Ha, Milpitas, CA (US); Sushant Paithane, Maharashtra (IN); Durvesh Ashok Raut, Maharashtra (IN)

(73) Assignee: FireEye, Inc., Milpitas, CA (US)

( * ) Notice: Subject to any disclaimer, the term of this patent is extended or adjusted under 35 U.S.C. 154(b) by 7 days.

(21) Appl. No.: 15/627,266

(22) Filed: Jun. 19, 2017

Related U.S. Application Data

(60) Provisional application No. 62/479,213, filed on Mar. 30, 2017.

(51) Int. Cl.
*G06F 21/56* (2013.01)
*G06F 9/455* (2018.01)
*G06F 21/55* (2013.01)

(52) U.S. Cl.
CPC ........ *G06F 21/566* (2013.01); *G06F 9/45545* (2013.01); *G06F 9/45558* (2013.01); *G06F 21/552* (2013.01); *G06F 2009/45587* (2013.01); *G06F 2009/45591* (2013.01); *G06F 2221/034* (2013.01)

(58) Field of Classification Search
CPC .............. G06F 21/566; G06F 9/45545; G06F 9/45558; G06F 21/552; G06F 2009/45587; G06F 2009/4559; G06F 2221/034
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Techane Gergiso
(74) *Attorney, Agent, or Firm* — Rutan & Tucker, LLP

(57) ABSTRACT

According to one embodiment, a computerized method features monitoring behaviors of an object during processing within a guest system of a virtual machine. Within a guest system, a rule-based analysis of data associated with the monitored behaviors is conducted. The rule-based analysis includes prioritizing data associated with the monitored behaviors that correspond to an exception, and thereafter, storing the data associated with the monitored behaviors that correspond to the exception into a prescribed area of a virtual image file. The prescribed area is accessible by (i) logic within the guest system and (ii) logic within a host system of the virtual machine.

21 Claims, 5 Drawing Sheets

(56) References Cited

U.S. PATENT DOCUMENTS

| | | |
|---|---|---|
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivehenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,679 B1 * | 4/2008 | Le .................. G06F 17/30067 713/1 |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |

(56) References Cited

U.S. PATENT DOCUMENTS

| | | |
|---|---|---|
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,856,782 B2 * | 10/2014 | Ghosh .................... G06F 21/53 718/1 |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |

(56) References Cited

U.S. PATENT DOCUMENTS

| | | |
|---|---|---|
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1* | 4/2005 | Ross .................. G06F 9/45533 718/1 |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |

(56) References Cited

U.S. PATENT DOCUMENTS

| | | | |
|---|---|---|---|
| 2007/0143827 A1* | 6/2007 | Nicodemus | G06F 21/6218 726/2 |
| 2007/0156895 A1 | 7/2007 | Vuong | |
| 2007/0157180 A1 | 7/2007 | Tillmann et al. | |
| 2007/0157306 A1 | 7/2007 | Elrod et al. | |
| 2007/0168988 A1 | 7/2007 | Eisner et al. | |
| 2007/0171824 A1 | 7/2007 | Ruello et al. | |
| 2007/0174915 A1 | 7/2007 | Gribble et al. | |
| 2007/0192500 A1 | 8/2007 | Lum | |
| 2007/0192858 A1 | 8/2007 | Lum | |
| 2007/0198275 A1 | 8/2007 | Malden et al. | |
| 2007/0208822 A1 | 9/2007 | Wang et al. | |
| 2007/0220607 A1 | 9/2007 | Sprosts et al. | |
| 2007/0233698 A1* | 10/2007 | Sundar | G06F 8/60 |
| 2007/0240218 A1 | 10/2007 | Tuvell et al. | |
| 2007/0240219 A1 | 10/2007 | Tuvell et al. | |
| 2007/0240220 A1 | 10/2007 | Tuvell et al. | |
| 2007/0240222 A1 | 10/2007 | Tuvell et al. | |
| 2007/0250930 A1 | 10/2007 | Aziz et al. | |
| 2007/0256132 A2 | 11/2007 | Oliphant | |
| 2007/0271446 A1 | 11/2007 | Nakamura | |
| 2008/0005782 A1 | 1/2008 | Aziz | |
| 2008/0018122 A1 | 1/2008 | Zierler et al. | |
| 2008/0028463 A1 | 1/2008 | Dagon et al. | |
| 2008/0040710 A1 | 2/2008 | Chiriac | |
| 2008/0046781 A1 | 2/2008 | Childs et al. | |
| 2008/0066179 A1 | 3/2008 | Liu | |
| 2008/0072326 A1 | 3/2008 | Danford et al. | |
| 2008/0077793 A1 | 3/2008 | Tan et al. | |
| 2008/0080392 A1* | 4/2008 | Walsh | H04L 29/12113 370/254 |
| 2008/0080518 A1 | 4/2008 | Hoeflin et al. | |
| 2008/0086720 A1 | 4/2008 | Lekel | |
| 2008/0098476 A1 | 4/2008 | Syversen | |
| 2008/0120722 A1 | 5/2008 | Sima et al. | |
| 2008/0134177 A1* | 6/2008 | Fitzgerald | G06F 21/51 718/1 |
| 2008/0134178 A1 | 6/2008 | Fitzgerald et al. | |
| 2008/0134334 A1 | 6/2008 | Kim et al. | |
| 2008/0141376 A1 | 6/2008 | Clausen et al. | |
| 2008/0184367 A1 | 7/2008 | McMillan et al. | |
| 2008/0184373 A1 | 7/2008 | Traut et al. | |
| 2008/0189787 A1 | 8/2008 | Arnold et al. | |
| 2008/0201778 A1 | 8/2008 | Guo et al. | |
| 2008/0209557 A1* | 8/2008 | Herley | G06F 21/565 726/23 |
| 2008/0215742 A1 | 9/2008 | Goldszmidt et al. | |
| 2008/0222729 A1 | 9/2008 | Chen et al. | |
| 2008/0263665 A1 | 10/2008 | Ma et al. | |
| 2008/0295172 A1 | 11/2008 | Bohacek | |
| 2008/0301810 A1 | 12/2008 | Lehane et al. | |
| 2008/0307524 A1 | 12/2008 | Singh et al. | |
| 2008/0313738 A1 | 12/2008 | Enderby | |
| 2008/0320594 A1 | 12/2008 | Jiang | |
| 2009/0003317 A1 | 1/2009 | Kasralikar et al. | |
| 2009/0007100 A1 | 1/2009 | Field et al. | |
| 2009/0013408 A1 | 1/2009 | Schipka | |
| 2009/0031423 A1 | 1/2009 | Liu et al. | |
| 2009/0036111 A1 | 2/2009 | Danford et al. | |
| 2009/0037835 A1 | 2/2009 | Goldman | |
| 2009/0044024 A1 | 2/2009 | Oberheide et al. | |
| 2009/0044265 A1* | 2/2009 | Ghosh | H04L 63/1416 726/14 |
| 2009/0044274 A1 | 2/2009 | Budko et al. | |
| 2009/0064332 A1 | 3/2009 | Porras et al. | |
| 2009/0070752 A1* | 3/2009 | Alpern | G06F 8/443 717/148 |
| 2009/0077666 A1 | 3/2009 | Chen et al. | |
| 2009/0083369 A1 | 3/2009 | Marmor | |
| 2009/0083855 A1 | 3/2009 | Apap et al. | |
| 2009/0089879 A1 | 4/2009 | Wang et al. | |
| 2009/0094697 A1 | 4/2009 | Provos et al. | |
| 2009/0113425 A1 | 4/2009 | Ports et al. | |
| 2009/0125976 A1 | 5/2009 | Wassermann et al. | |
| 2009/0126015 A1 | 5/2009 | Monastyrsky et al. | |
| 2009/0126016 A1 | 5/2009 | Sobko et al. | |
| 2009/0133125 A1 | 5/2009 | Choi et al. | |
| 2009/0144823 A1 | 6/2009 | Lamastra et al. | |
| 2009/0158430 A1 | 6/2009 | Borders | |
| 2009/0164994 A1* | 6/2009 | Vasilevsky | G06F 9/45533 718/1 |
| 2009/0172815 A1 | 7/2009 | Gu et al. | |
| 2009/0187992 A1 | 7/2009 | Poston | |
| 2009/0193293 A1 | 7/2009 | Stolfo et al. | |
| 2009/0198651 A1 | 8/2009 | Shiffer et al. | |
| 2009/0198670 A1 | 8/2009 | Shiffer et al. | |
| 2009/0198689 A1 | 8/2009 | Frazier et al. | |
| 2009/0199274 A1 | 8/2009 | Frazier et al. | |
| 2009/0199296 A1 | 8/2009 | Xie et al. | |
| 2009/0228233 A1 | 9/2009 | Anderson et al. | |
| 2009/0241187 A1 | 9/2009 | Troyansky | |
| 2009/0241190 A1 | 9/2009 | Todd et al. | |
| 2009/0265692 A1 | 10/2009 | Godefroid et al. | |
| 2009/0271867 A1 | 10/2009 | Zhang | |
| 2009/0300415 A1 | 12/2009 | Zhang et al. | |
| 2009/0300761 A1 | 12/2009 | Park et al. | |
| 2009/0328185 A1 | 12/2009 | Berg et al. | |
| 2009/0328221 A1 | 12/2009 | Blumfield et al. | |
| 2010/0005146 A1 | 1/2010 | Drako et al. | |
| 2010/0011205 A1 | 1/2010 | McKenna | |
| 2010/0017546 A1 | 1/2010 | Poo et al. | |
| 2010/0030996 A1 | 2/2010 | Butler, II | |
| 2010/0031353 A1 | 2/2010 | Thomas et al. | |
| 2010/0037314 A1 | 2/2010 | Perdisci et al. | |
| 2010/0043073 A1 | 2/2010 | Kuwamura | |
| 2010/0054278 A1 | 3/2010 | Stolfo et al. | |
| 2010/0058474 A1 | 3/2010 | Hicks | |
| 2010/0064044 A1 | 3/2010 | Nonoyama | |
| 2010/0077481 A1 | 3/2010 | Polyakov et al. | |
| 2010/0083376 A1 | 4/2010 | Pereira et al. | |
| 2010/0115621 A1 | 5/2010 | Staniford et al. | |
| 2010/0132038 A1 | 5/2010 | Zaitsev | |
| 2010/0154056 A1 | 6/2010 | Smith et al. | |
| 2010/0180344 A1 | 7/2010 | Malyshev et al. | |
| 2010/0192223 A1 | 7/2010 | Ismael et al. | |
| 2010/0220863 A1 | 9/2010 | Dupaquis et al. | |
| 2010/0235831 A1 | 9/2010 | Dittmer | |
| 2010/0251104 A1 | 9/2010 | Massand | |
| 2010/0251363 A1* | 9/2010 | Todorovic | G06F 21/53 726/22 |
| 2010/0281102 A1 | 11/2010 | Chinta et al. | |
| 2010/0281541 A1 | 11/2010 | Stolfo et al. | |
| 2010/0281542 A1 | 11/2010 | Stolfo et al. | |
| 2010/0287260 A1 | 11/2010 | Peterson et al. | |
| 2010/0299754 A1 | 11/2010 | Amit et al. | |
| 2010/0306173 A1 | 12/2010 | Frank | |
| 2011/0004737 A1 | 1/2011 | Greenebaum | |
| 2011/0025504 A1 | 2/2011 | Lyon et al. | |
| 2011/0041179 A1 | 2/2011 | St Hlberg | |
| 2011/0047594 A1 | 2/2011 | Mahaffey et al. | |
| 2011/0047620 A1 | 2/2011 | Mahaffey et al. | |
| 2011/0055907 A1 | 3/2011 | Narasimhan et al. | |
| 2011/0078794 A1 | 3/2011 | Manni et al. | |
| 2011/0093951 A1 | 4/2011 | Aziz | |
| 2011/0099620 A1 | 4/2011 | Stavrou et al. | |
| 2011/0099633 A1 | 4/2011 | Aziz | |
| 2011/0099635 A1 | 4/2011 | Silberman et al. | |
| 2011/0113231 A1 | 5/2011 | Kaminsky | |
| 2011/0126207 A1* | 5/2011 | Wipfel | H04L 9/3213 718/104 |
| 2011/0145918 A1 | 6/2011 | Jung et al. | |
| 2011/0145920 A1 | 6/2011 | Mahaffey et al. | |
| 2011/0145934 A1 | 6/2011 | Abramovici et al. | |
| 2011/0153697 A1* | 6/2011 | Nickolov | G06F 9/4856 707/827 |
| 2011/0167493 A1 | 7/2011 | Song et al. | |
| 2011/0167494 A1 | 7/2011 | Bowen et al. | |
| 2011/0173213 A1 | 7/2011 | Frazier et al. | |
| 2011/0173460 A1 | 7/2011 | Ito et al. | |
| 2011/0185428 A1* | 7/2011 | Sallam | G06F 21/566 726/24 |
| 2011/0219449 A1 | 9/2011 | St. Neitzel et al. | |

(56) References Cited

U.S. PATENT DOCUMENTS

| | | | |
|---|---|---|---|
| 2011/0219450 A1* | 9/2011 | McDougal | G06F 21/56 726/23 |
| 2011/0219451 A1* | 9/2011 | McDougal | G06F 21/562 726/23 |
| 2011/0225624 A1 | 9/2011 | Sawhney et al. | |
| 2011/0225655 A1 | 9/2011 | Niemela et al. | |
| 2011/0247072 A1 | 10/2011 | Staniford et al. | |
| 2011/0251992 A1* | 10/2011 | Bethlehem | H04L 12/2863 707/610 |
| 2011/0265182 A1 | 10/2011 | Peinado et al. | |
| 2011/0289582 A1 | 11/2011 | Kejriwal et al. | |
| 2011/0302587 A1 | 12/2011 | Nishikawa et al. | |
| 2011/0307954 A1 | 12/2011 | Melnik et al. | |
| 2011/0307955 A1 | 12/2011 | Kaplan et al. | |
| 2011/0307956 A1 | 12/2011 | Yermakov et al. | |
| 2011/0314546 A1 | 12/2011 | Aziz et al. | |
| 2012/0023593 A1 | 1/2012 | Puder et al. | |
| 2012/0054869 A1 | 3/2012 | Yen et al. | |
| 2012/0066698 A1 | 3/2012 | Yanoo | |
| 2012/0066762 A1* | 3/2012 | Todorovic | G06F 21/53 726/22 |
| 2012/0079596 A1 | 3/2012 | Thomas | |
| 2012/0084859 A1 | 4/2012 | Radinsky et al. | |
| 2012/0096553 A1 | 4/2012 | Srivastava et al. | |
| 2012/0110667 A1* | 5/2012 | Zubrilin | G06F 21/56 726/24 |
| 2012/0117652 A1 | 5/2012 | Manni et al. | |
| 2012/0121154 A1 | 5/2012 | Xue et al. | |
| 2012/0124426 A1 | 5/2012 | Maybee et al. | |
| 2012/0174186 A1 | 7/2012 | Aziz et al. | |
| 2012/0174196 A1 | 7/2012 | Bhogavilli et al. | |
| 2012/0174218 A1 | 7/2012 | McCoy et al. | |
| 2012/0198279 A1 | 8/2012 | Schroeder | |
| 2012/0210423 A1 | 8/2012 | Friedrichs et al. | |
| 2012/0222121 A1 | 8/2012 | Staniford et al. | |
| 2012/0254995 A1* | 10/2012 | Sallam | G06F 21/566 726/22 |
| 2012/0255015 A1 | 10/2012 | Sahita et al. | |
| 2012/0255017 A1 | 10/2012 | Sallam | |
| 2012/0260342 A1 | 10/2012 | Dube et al. | |
| 2012/0266244 A1 | 10/2012 | Green et al. | |
| 2012/0278886 A1 | 11/2012 | Luna | |
| 2012/0290702 A1* | 11/2012 | Vincent | G06F 9/45558 709/223 |
| 2012/0297489 A1 | 11/2012 | Dequevy | |
| 2012/0330801 A1 | 12/2012 | McDougal et al. | |
| 2012/0331553 A1 | 12/2012 | Aziz et al. | |
| 2013/0007506 A1* | 1/2013 | Jain | G06F 11/1484 714/4.12 |
| 2013/0014259 A1 | 1/2013 | Gribble et al. | |
| 2013/0036472 A1 | 2/2013 | Aziz | |
| 2013/0047257 A1 | 2/2013 | Aziz | |
| 2013/0074185 A1 | 3/2013 | McDougal et al. | |
| 2013/0086684 A1 | 4/2013 | Mohler | |
| 2013/0097699 A1 | 4/2013 | Balupari et al. | |
| 2013/0097706 A1 | 4/2013 | Titonis et al. | |
| 2013/0111587 A1 | 5/2013 | Goel et al. | |
| 2013/0117852 A1 | 5/2013 | Stute | |
| 2013/0117855 A1 | 5/2013 | Kim et al. | |
| 2013/0139264 A1 | 5/2013 | Brinkley et al. | |
| 2013/0160125 A1 | 6/2013 | Likhachev et al. | |
| 2013/0160127 A1 | 6/2013 | Jeong et al. | |
| 2013/0160130 A1 | 6/2013 | Mendelev et al. | |
| 2013/0160131 A1 | 6/2013 | Madou et al. | |
| 2013/0167236 A1 | 6/2013 | Sick | |
| 2013/0174214 A1 | 7/2013 | Duncan | |
| 2013/0185789 A1 | 7/2013 | Hagiwara et al. | |
| 2013/0185795 A1 | 7/2013 | Winn et al. | |
| 2013/0185798 A1 | 7/2013 | Saunders et al. | |
| 2013/0191915 A1 | 7/2013 | Antonakakis et al. | |
| 2013/0196649 A1 | 8/2013 | Paddon et al. | |
| 2013/0227691 A1 | 8/2013 | Aziz et al. | |
| 2013/0246370 A1 | 9/2013 | Bartram et al. | |
| 2013/0247186 A1 | 9/2013 | LeMasters | |
| 2013/0263260 A1 | 10/2013 | Mahaffey et al. | |
| 2013/0291109 A1 | 10/2013 | Staniford et al. | |
| 2013/0298243 A1 | 11/2013 | Kumar et al. | |
| 2013/0318038 A1 | 11/2013 | Shiffer et al. | |
| 2013/0318073 A1 | 11/2013 | Shiffer et al. | |
| 2013/0325791 A1 | 12/2013 | Shiffer et al. | |
| 2013/0325792 A1 | 12/2013 | Shiffer et al. | |
| 2013/0325871 A1 | 12/2013 | Shiffer et al. | |
| 2013/0325872 A1 | 12/2013 | Shiffer et al. | |
| 2014/0032875 A1 | 1/2014 | Butler | |
| 2014/0053260 A1 | 2/2014 | Gupta et al. | |
| 2014/0053261 A1 | 2/2014 | Gupta et al. | |
| 2014/0130158 A1 | 5/2014 | Wang et al. | |
| 2014/0137180 A1 | 5/2014 | Lukacs et al. | |
| 2014/0169762 A1 | 6/2014 | Ryu | |
| 2014/0179360 A1 | 6/2014 | Jackson et al. | |
| 2014/0181131 A1 | 6/2014 | Ross | |
| 2014/0181984 A1* | 6/2014 | Kundu | G06F 17/30129 726/26 |
| 2014/0189687 A1 | 7/2014 | Jung et al. | |
| 2014/0189866 A1 | 7/2014 | Shiffer et al. | |
| 2014/0189882 A1 | 7/2014 | Jung et al. | |
| 2014/0237600 A1 | 8/2014 | Silberman et al. | |
| 2014/0280245 A1 | 9/2014 | Wilson | |
| 2014/0283037 A1 | 9/2014 | Sikorski et al. | |
| 2014/0283063 A1 | 9/2014 | Thompson et al. | |
| 2014/0328204 A1 | 11/2014 | Klotsche et al. | |
| 2014/0337836 A1 | 11/2014 | Ismael | |
| 2014/0344926 A1 | 11/2014 | Cunningham et al. | |
| 2014/0351810 A1* | 11/2014 | Pratt | G06F 9/45545 718/1 |
| 2014/0351935 A1 | 11/2014 | Shao et al. | |
| 2014/0380473 A1 | 12/2014 | Bu et al. | |
| 2014/0380474 A1 | 12/2014 | Paithane et al. | |
| 2015/0007312 A1 | 1/2015 | Pidathala et al. | |
| 2015/0033227 A1* | 1/2015 | Lin | G06F 21/55 718/1 |
| 2015/0074536 A1* | 3/2015 | Varadharajan | G06F 16/188 715/734 |
| 2015/0096022 A1 | 4/2015 | Vincent et al. | |
| 2015/0096023 A1 | 4/2015 | Mesdaq et al. | |
| 2015/0096024 A1 | 4/2015 | Haq et al. | |
| 2015/0096025 A1 | 4/2015 | Ismael | |
| 2015/0180886 A1 | 6/2015 | Staniford et al. | |
| 2015/0186645 A1 | 7/2015 | Aziz et al. | |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0372980 A1 | 12/2015 | Eyada | |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0261612 A1 | 9/2016 | Mesdaq et al. | |
| 2016/0285914 A1* | 9/2016 | Singh | H04L 63/20 |
| 2016/0301703 A1 | 10/2016 | Aziz | |
| 2016/0306966 A1* | 10/2016 | Srivastava | H04L 63/08 |
| 2016/0335110 A1 | 11/2016 | Paithane et al. | |
| 2016/0337390 A1* | 11/2016 | Sridhara | G06F 3/0484 |
| 2017/0083703 A1 | 3/2017 | Abbasi et al. | |
| 2018/0013770 A1 | 1/2018 | Ismael | |
| 2018/0048660 A1 | 2/2018 | Paithane et al. | |
| 2018/0121316 A1 | 5/2018 | Ismael et al. | |
| 2018/0288077 A1 | 10/2018 | Siddiqui et al. | |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |

(56) References Cited

FOREIGN PATENT DOCUMENTS

| WO | 2012/075336 A1 | 6/2012 |
|---|---|---|
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edu/about.chris/research/doc/esec07. sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).

(56) References Cited

OTHER PUBLICATIONS

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

DATA EXTRACTION SYSTEM FOR MALWARE ANALYSIS

CROSS-REFERENCE TO RELATED APPLICATIONS

This application claims the benefit of priority on U.S. Provisional Patent Application No. 62/479,213, the entire contents of which are incorporated by reference herein.

FIELD

Embodiments of the disclosure relate to the field of cybersecurity. More specifically, one embodiment of the disclosure relates to a data extraction system that ensures the host system of a network device has access to results of analysis conducted by a network device's guest system.

GENERAL BACKGROUND

Cybersecurity attacks have become a pervasive problem for organizations as many electronic devices and other resources have been subjected to attack and compromised. An attack may involve the infiltration of malicious software onto an electronic device or an attack focusing on an exploit residing within an electronic device to perpetrate the cybersecurity attack. Both of these types of attacks are the result of "malware."

Recently, malware detection has undertaken two different conventional approaches: (1) "on-site" placement of dedicated malware detection appliances at various ingress points throughout a network or subnetwork and (2) deployment of malware detection appliances as a cloud or third party service. Both of these approaches rely on virtual machines operating as part of a virtualized environment to test an object for a potential presence of malware or any affiliation with malware.

In general, a virtual machine (VM) features a virtualized guest system and a host system. The "guest system" includes a separate and independent instance of an operating system utilized by an electronic device represented by the VM along with application software and software that supports communications with the host system. The "host system" includes software for communications with at least the guest system and hardware that provides the guest system or multiple guest systems with computing resources, such as processing power, memory access, and network I/O (input/output). Malware analysis of an object is conducted by the guest system. However, for subsequent analysis of that object, the malware analysis results also need to be made available to the host system.

In certain situations, during analysis of an object, the guest system may crash, namely performance of an unauthorized activity by the object may cause instability or termination of a process running in the virtual machine or operability of the virtual machine itself. After a crash, unless preventative measures are undertaken for data preservation, the information needed for accessing the malware analysis results from the guest system is no longer available to the host system. As a result, conventionally, some malware detection appliances are configured to conduct input/output (I/O) operations of mounting content (e.g., files, folders, etc.) within a virtual file system in the guest system to the host system. This "mounting" involves copying the entire contents contained within the virtual file system to host system memory (e.g., hard disk drive). While the host system is provided with an ability to access malware analysis, this mounting scheme is complex and extremely I/O intensive, which tends to reduce the amount of time reserved for malware analysis and increases the amount of time needed for data management.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
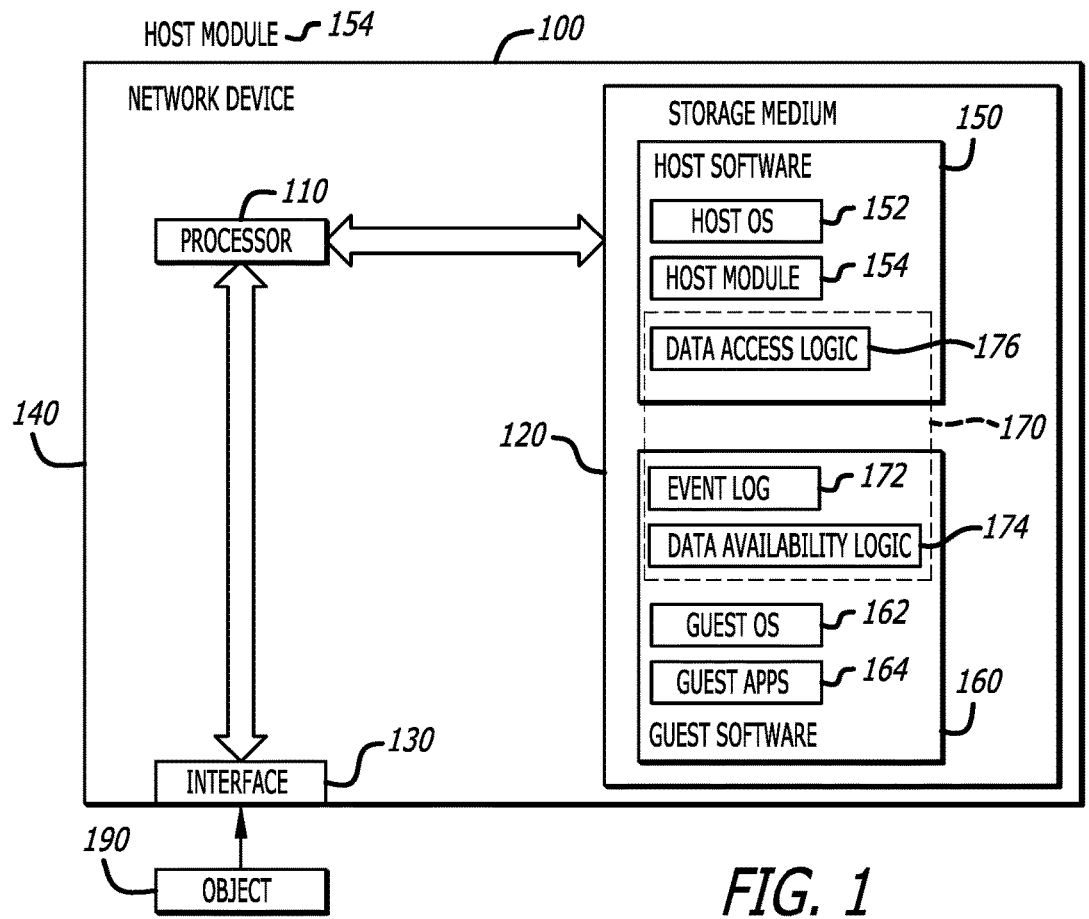
FIG. 1 is a block diagram of an exemplary embodiment of a network device including a system that supports data extraction from the virtualized guest system to the host system.

Embodiments of a system and method for data extraction from a virtualized environment including a virtualized guest system to a host system is described. The data extracted from the virtualized environment may be used for malware analysis, code quality assurance, or any other use where access to large data stores without mounting disks is necessary or preferable. According to one embodiment of the disclosure, the data extraction system features (i) event monitoring logic (hereinafter, "event log") (ii) data availability logic, and (iii) data access logic. These logic components are deployed within the virtualized environment, namely the virtualized guest system and the host system.

Operating within the guest system, the event log monitors behaviors of an object during processing within the guest system. Also operating within the guest system, the data availability logic controls the storage of data associated with behaviors monitored during processing of the object, where such control includes determining whether post-analysis of at least some of the data may be useful in determining, with increased accuracy, if the object is associated with malware (e.g., the object includes malware or is affiliated with malware such as operating in concert with malware). This data is referred to as "post-analysis data."

According to one embodiment of the disclosure, during runtime, the data availability logic determines the post-analysis data and stores the post-analysis data within a prescribed area of a virtual image file. The virtual image file corresponds to a guest system snapshot (image of software running on the guest system). The prescribed area is managed by a virtual file system that may be part of the virtual image file, and the location of the prescribed area is known and accessible by the host system. The prescribed area may be defined by a prescribed offset to a particular storage location (e.g., absolute offset of the virtual image file) along with a prescribed length (e.g., an amount of measured data from the offset such as 64 megabytes, 128 megabytes, 256 megabytes, etc.).

The data access logic, which operates within the host system, is configured to extract the entire contents of the prescribed area of the virtual image file stored in a guest file system in response to a triggering event. Potential triggering events may include termination of a work order associated with an object under analysis or expiration of a predetermined period of time from a selected point in time (e.g., creation of the work order, receipt of the work order by the guest system, etc.). After extraction, the data access logic analyzes the extracted contents to selectively store only actual post-analysis data into memory within the host system. This extraction and analysis scheme preserves the ability to retrieve and extract post-analysis data quicker than conventional schemes by avoiding the need to mount the entire volume of the guest file system to the host system.

More specifically, the data extraction system logic may be partially implemented in the guest system operating in coordination with the host system. The host system may be configured to (i) provide an object for analysis to the guest system and (ii) receive results of the malware analysis (e.g., one or more analyzed objects and meta information associated with the malware analysis of the object within the guest system). The guest system is configured to receive and process the object within a virtual machine that is part of the virtualized environment. Such processing may involve execution of the object or simply performance of a series of operations on the object for subsequent determination as to whether a probability of the object being malware exceeds a threshold. The guest system is further configured with the event log that monitors behaviors of the object and/or the guest system during processing of the object within the virtualized environment. The event log may use application hooks, system hooks, or other event monitoring techniques to detect certain behaviors, where data associated with the detected behaviors is logged and stored. Such storage may resemble storage of data within a database and/or storage of data within a file.

During processing of the object, the monitored behaviors are analyzed by the data availability logic. In particular, according to one embodiment of the disclosure, the data availability logic may conduct a rule-based analysis of the behaviors, which includes prioritizing data associated with monitored behaviors that correspond to particular exceptions, namely a malware (payload) exceptions, memory exceptions, and/or artifact exceptions. As an illustrative example, during run-time, the data availability logic analyzes data associated with the monitored behaviors in accordance with a first set of rules, which are configured to identify, through compliance and/or non-compliance with the first set of rules, what portions of the analyzed data are associated with malware exceptions (i.e., certain types of operations conducted by the object itself where the data associated with such operations are considered "post-analysis data"). Examples of data associated with monitored behaviors that correspond to particular malware exceptions may include, but are not limited or restricted to "modified" objects, namely newly created objects (e.g., an executable, script, text file, image, etc.) or system altering objects (e.g., causes changes to registry value, stored setting, etc.).

Given that the prescribed area of the virtual image file is limited in size, the post-analysis data may be prioritized based on any combination of parameters. For instance, one parameter may include object type (e.g., determined by analysis of the object's extension). Another parameter may include when the malware exception occurred during the processing cycle (e.g., malware exceptions that occur during start-up may be assigned higher priorities than other periods during run-time). Yet another parameter may include the type of content being modified (e.g., creation of an executable file may be assigned a higher priority than creation of a text file). This priority may be considered when determining what data (e.g., the modified object and meta information associated with that object such as its source object, time of creation, etc.) should be part of the stored post-analysis data. Overwriting (substitution) of certain post-analysis data may be performed during run-time, especially when the prescribed area is reaching capacity and higher priority data needs to be made available to the host system.

As another illustrative example, during run-time, the data availability logic analyzes the monitored behaviors in accordance with a second set of rules, which are configured to identify and prioritize memory exceptions, such as detection of a certain memory type (e.g., shell code), or modification of certain stored content within the guest system (e.g., registry value, setting, etc.). These memory exceptions may correspond to post-analysis data. Yet another illustrative example, during run-time, the data availability logic analyzes the monitored behaviors in accordance with a third set of rules, which are configured to identify and prioritize artifact exceptions (e.g., occurrences of certain anomalous behaviors) as post-analysis data. One illustrative example of an artifact exception includes access/usage of a certain type of script (e.g., JavaScript) for example.

Thereafter, the data availability logic controls the storage of the post-analysis data in the prescribed area, which is a storage location within a virtual image file stored in the guest system and its contents are made available to the host system. According to one embodiment of the disclosure, the prescribed area may be determined based, at least in part, on a default setting (e.g., fixed offset and length), or a configuration file loaded into the network device may be used to provide such information. The data availability logic may make the post-analysis data available to the data access logic by copying the post-analysis data to the prescribed area and/or storing links within the prescribed area. The links provide accessibility to the post-analysis data stored within one or more different storage areas.

The data access logic operates within the host system and has access to the entire contents of the prescribed area. The data access logic is configured to extract the entire contents within the prescribed area, and thereafter, further extract the actual post-analysis data stored by the data availability logic from the prescribed area content. Thereafter, the post-analysis data may be stored on disk within the host system and made accessible by a post-processing analysis system in conducting a further analysis of certain malware analysis results for an object.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

As briefly described above, the term "malware" may be broadly construed as any code or activity that initiates or furthers a malicious cyber-attack or any operations associated with unauthorized, anomalous or unwanted behavior. For instance, malware may correspond to a type of malicious computer code that, as an illustrative example, executes an exploit to take advantage of a vulnerability in a network, network device or software, for example, to gain unauthorized access, harm or co-opt operation of a network device or misappropriate, modify or delete data. Alternatively, as another illustrative example, malware may correspond to information (e.g., executable code, script(s), data, command(s), etc.) that is designed to cause the network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

The term "network device" may be construed as a physical, electronic device or a virtual electronic device that is based on the execution of one or more software modules. The network device may be communicatively coupled to a public network such as the Internet or a private network such as a wireless data telecommunication network, wide area network, a type of local area network (LAN), or a combination of networks. Examples of the network device may include, but are not limited or restricted to, a physical electronic devices (e.g., a personal computer such as a desktop, laptop, tablet or netbook; a mobile phone; a stand-alone appliance; a sensor; a server; a router; etc.) or a virtual network device (e.g., firewall, one or more software modules supporting guest-to-host system data extraction).

The term "message" generally refers to information in a prescribed format and transmitted in accordance with a suitable delivery protocol. Hence, each message may be in the form of one or more packets, frames, or any other series of bits having the prescribed format.

The term "transmission medium" may be construed as a physical or logical communication path between two or more electronic devices. For instance, as a physical communication path, wired and/or wireless interconnects in the form of electrical wiring, optical fiber, cable, bus trace, or a wireless channel using infrared, radio frequency (RF), may be used.

The term "object" generally relates to content (or a reference to access such content) having a logical structure or organization that enables it to be classified for purposes of analysis for malware. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data. The object may be retrieved from information in transit (e.g., one or more packets, one or more flows each being a plurality of related packets, etc.) or information at rest (e.g., data bytes from a storage medium).

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary block diagram of an illustrative embodiment of a network device 100 featuring a data extraction system 170 is shown. Herein, the network device 100 features a plurality of electronic components, including one or more hardware processors 110 (generally referred to as "processor"), at least one non-transitory storage medium 120, and an (network and/or I/O) interface 130. These components may be encased in a housing 140, which may be made entirely or partially of a rigid material (e.g., hard plastic, metal, glass, composites, or any combination thereof) that protects these components from certain environmental conditions.

As illustrated in FIG. 1, the processor 110 is circuitry that is configured to execute logic stored within the storage medium 120 to generate a virtualized environment, which is responsible for analyzing objects to determine whether the object is associated with malware (e.g., analysis for a presence of malware or any affiliation with malware). One example of the processor 110 includes an Intel® (x86) central processing unit (CPU) with an instruction set architecture. Alternatively, processor 110 may include another type of CPU, a digital signal processor (DSP), an Application Specific Integrated Circuit (ASIC), a field-programmable gate array (FPGA), or any other hardware component with data processing capability.

Figure 2:
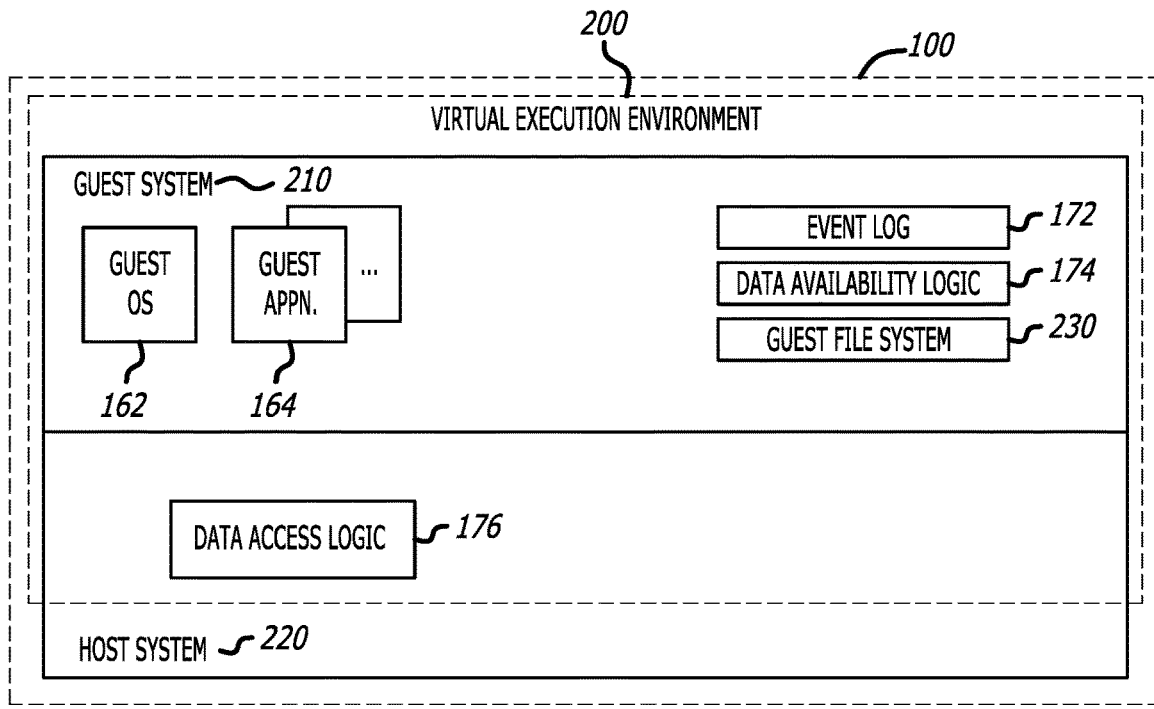
FIG. 2 is an exemplary block diagram of a logical representation of the data extraction system logic of FIG. 1.

Referring to both FIG. 1 and FIG. 2, the storage medium 120 may include a plurality of storage locations that are addressable by the processor 110 and contain host software 150, guest software 160, and data extraction system logic 170. The data extraction system logic 170 ensures that malware analysis results associated with an object 190 (under analysis) are available to certain logic within a virtual execution environment 200 of the network device 100 (e.g., logic with "guest system 210" and "host system" 220). The virtual execution environment 200 is configured so that the malware analysis results are available to the host system 220 independent of the operating state of the guest system 210 that is responsible for processing the object 190 and determining whether the object 190 exhibits behaviors that tend to suggest the object 190 is associated with malware.

Referring still to FIGS. 1-2, according to one embodiment of the disclosure, the host software 150 includes a host OS 152 and one or more software modules (host software module) 154 that, when executed, produce processes that control the general functionality of the network device 100. In particular, one or more of these processes may be responsible for scheduling the malware analysis of received objects by a guest system (e.g., guest system 210). At least one other process may be responsible for retrieval, by a portion of data extraction system logic 170 (e.g., data access logic 176) residing in the host system 220, of the malware analysis results for objects processed by the guest system 210 operating as a VM guest instance.

As shown in FIGS. 1-2, the virtualization software 160 is responsible for instantiation of one or more guest (VM) systems (e.g., guest system 210), where the guest system 210 is operating in accordance with a guest OS 162 and one or more guest applications 164. When multiple guest (VM) systems are deployed, the guest OS 162 and/or guest applications 164 used by each guest system may differ. Also, the guest OS 162 and/or guest applications 164 may differ from the host OS 152 and any applications of the host software 154 that are part of the functionality of the host system 220.

Also, the data extraction system logic 170 may include, but is not limited or restricted to the following logic: (i) event monitoring logic (hereinafter, "event log") 172, (ii) data availability logic 174, and (iii) the data access logic 176. The event log 172 and data availability logic 174 operate as part of the guest system 200 while the data access logic 176 operates as part of the host system 220. Specifically, the event log 172 monitors behaviors of the object 190 during processing within the virtual execution environment 200.

Operating with the event log 172, the data availability logic 174 controls the storage of data associated with the monitored behaviors, notably separating data where post-analysis assists in determining (or confirming) that the object includes malware (sometimes referred to as "post-analysis data") from data where post-analysis offers little to no benefit in malware analysis of the objet. The post-analysis data is stored in a prescribed area of the virtual image file that is maintained in the guest file system 230 and available to the data access logic 176 of the host system 220.

Returning back to FIG. 1, the interface 130 is configured to receive one or more incoming objects such as object 190. The object 190 may be a portion of data extracted from a data source or a copy of a portion of the data source. According to one embodiment of the disclosure, the "data source" may include information in transit (e.g., a plurality of packets) or information at rest (e.g., data bytes from a storage medium). For instance, the data source may include data propagating over a network such as a private network or a public network. Alternatively, the data source may be data in transit (e.g., a plurality of packets) or information at rest (e.g., data bytes from a storage medium).

Figure 3:
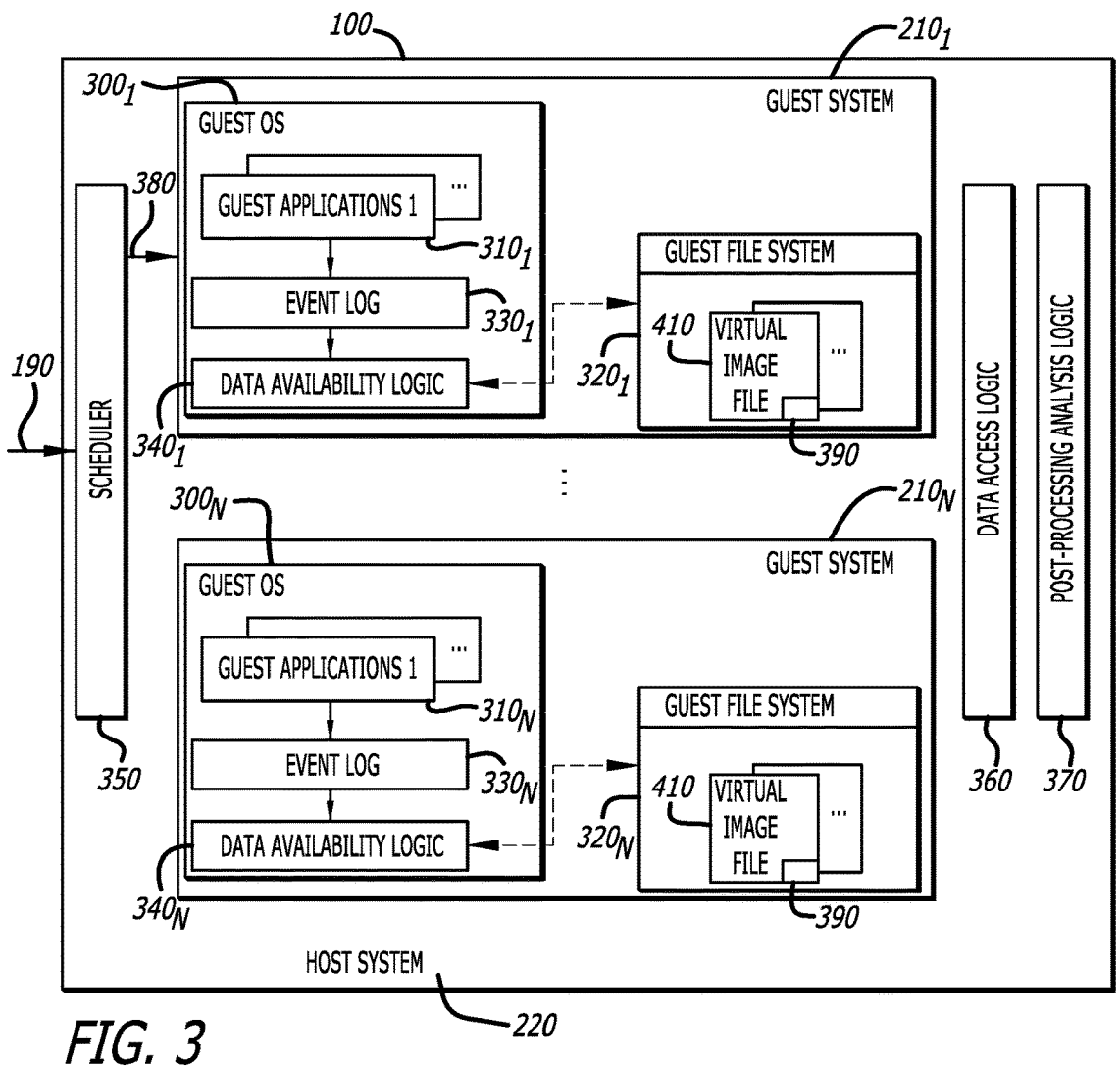
FIG. 3 is an exemplary block diagram of a more detailed logical representation of the network device of FIG. 1

As illustrated in FIG. 3, a more detailed logical representation of the network device 100 of FIG. 1 is shown. The network device 100 features one or more guest systems $210_1$-$210_N$ (N≥1) and the host system 220, where logic forming the data extraction system is partially deployed within the host system 220 and the guest systems $210_1$-$210_N$. As shown, each of the guest systems $210_1$-$210_N$ is provisioned (instantiated) to include a guest OS $300_1$-$300_N$, one or more guest applications $310_1$-$310_N$, a data store managed by a guest (virtual) file system $320_1$-$320_N$, event log $330_1$-$330_N$ and data availability logic $340_1$-$340_N$, respectively. The host system 220 comprises a scheduler 350, data access logic 360, and post-processing analysis logic 370. Herein, each of the event logs $330_1$-$330_N$ corresponds to event log 172 of FIG. 1 while each data availability logic $340_1$-$340_N$ and data access logic 360 correspond to data availability logic 174 and data access logic 176 of FIG. 1.

According to one embodiment, the scheduler 350 may be adapted to receive the object 190 and to provision one or more guest systems $210_1$-$210_N$ based meta information pertaining to the object 190 (e.g., object name, object type, creation date, media access control "MAC" address of sending network device, etc.). For instance, as an illustrative embodiment, each of the guest systems $210_1$ . . . $210_N$ may be provisioned with a different software profile, or alternatively, some or all of the guest systems $210_1$ . . . $210_N$ may be provisioned with identical software profiles.

Specifically, the scheduler 350 provisions the guest systems $210_1$-$210_N$ by generating a work order 380, namely a message including (a) software profile information for use in provisioning a recipient guest system (e.g., guest system $210_1$), (b) the object 190 for analysis, and/or (c) meta information associated with the object 190. The software profile information for provisioning the guest system $210_1$ may include information to install guest OS $300_1$ along with one or more guest applications $310_1$, the guest file system $320_1$ that manages storage within the guest system $210_1$, the event log $330_1$ and the data availability logic $340_1$. For example, the guest system $210_1$ may be provisioned by installing the guest OS $300_1$ and guest applications $310_1$ that correspond to a software configuration that is being used by electronic devices connected to a particular enterprise network or prevalent types of software configurations (e.g., WINDOWS® 10 OS or MAC OS® X; a certain version of a particular web browser such as Internet Explorer® or Chrome®; a certain version of word processor such as Microsoft® Office®; Apple® Pages™, or the like). The guest file system $320_1$, the event log $330_1$ and the data availability logic $340_1$ manage the determination and storage of the post-analysis data accumulated during processing of the object 190 within the guest system $210_1$.

The work order 380 further includes (i) information used in controlling the processing of the object 190 in accordance with a desired order of operations, at a desired time, and/or for a desired period of time, and (ii) information that identifies the prescribed area in a virtual image file for storage of the post-analysis data. The prescribed area may be identified by (a) an absolute offset from a starting address of the virtual image file and (b) a length (in a selected measuring unit such as bytes or words for example) from the offset.

Specifically, as shown in FIG. 3, operating within the guest system $210_1$, the event log $330_1$ monitors behaviors of the object 190 during processing within the guest system $210_1$ that is conducted to determine whether a probability of the object 190 being malware exceeds a threshold. Also operating within the guest system $210_1$, the data availability logic $340_1$ operates with the event log $330_1$ and guest file system $320_1$ to control storage of the data associated with the monitored behaviors, notably data that may require post-analysis to determine (or confirm) that the object 190 is associated with malware (referred to herein as "post-analysis data 390").

Figure 4:
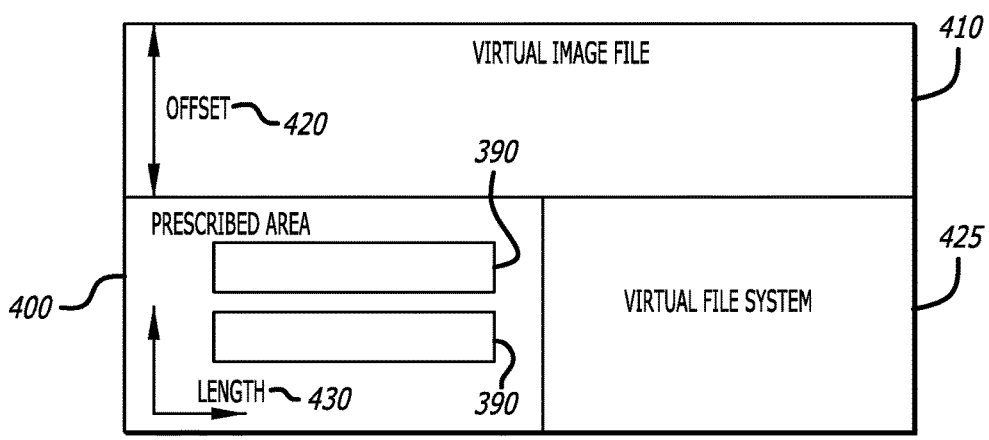
FIG. 4 is an exemplary embodiment of a prescribed area for storage of post-analysis data within a virtual file image as generally illustrated in FIG. 3.

According to one embodiment of the disclosure, referring to both FIGS. 3-4, the post-analysis data 390 may be stored with a prescribed area 400 for a virtual image file 410 (image of software running on the guest system). The prescribed area 400 is accessible by the host system 220 and is managed by a virtual file system 425 that is part of the virtual image file 410. The prescribed area 400 may be defined by an offset 420 from a particular storage location of the virtual image file 410 (e.g., starting address) along with a length 430 (e.g., an amount of measured data from the offset such as 128 megabytes, 256 megabytes, etc.). Some of the meta information associated with the object 190, including the offset 420 and length 430, are made available to the data access logic 360 as well.

The data access logic 360, which operates within the host system 220, handles extraction of data from the prescribed area 400 of the virtual image file 410 in response to a triggering event. For instance, upon either termination of the work order 380 upon completion or a guest (VM) system crash, the work order 380 is terminated and the data access logic 360 is prompted to retrieve data stored in the prescribed area 400 of its most recent virtual image file. After retrieval, the data access logic 360 analyzes the extracted data to selectively store only the actual post-analysis data 390 into memory (not shown) within the host system 220 so that a lesser number of I/O cycles is needed to preserve the post-analysis data. The post-processing analysis logic 370 is communicatively coupled to the host memory for retrieval of the post-analysis data and further analysis of such data in order to conclude, with better certainty, that the object 190 is malicious.

III. Operational Flow

Figure 5A:
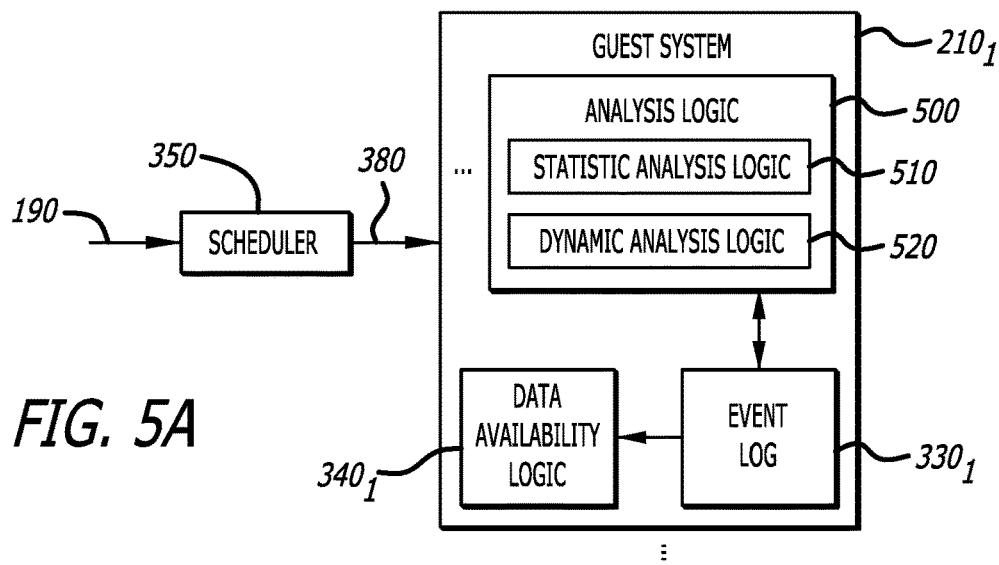
FIG. 5A-5C are exemplary embodiments of an operational flow between the event log, data availability logic and data access logic forming at least part of the data extraction system logic of FIG. 2.
Figure 5B:
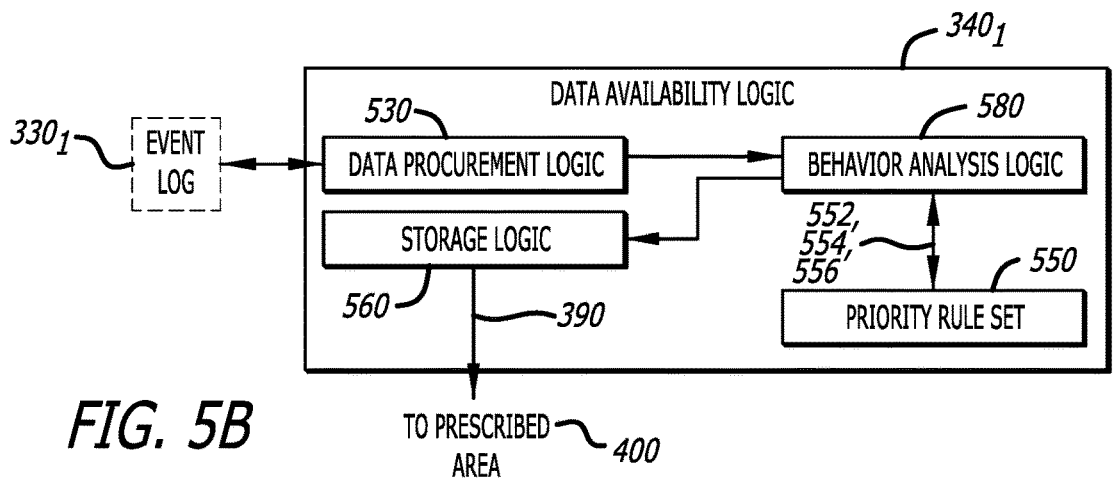
Figure 5C:
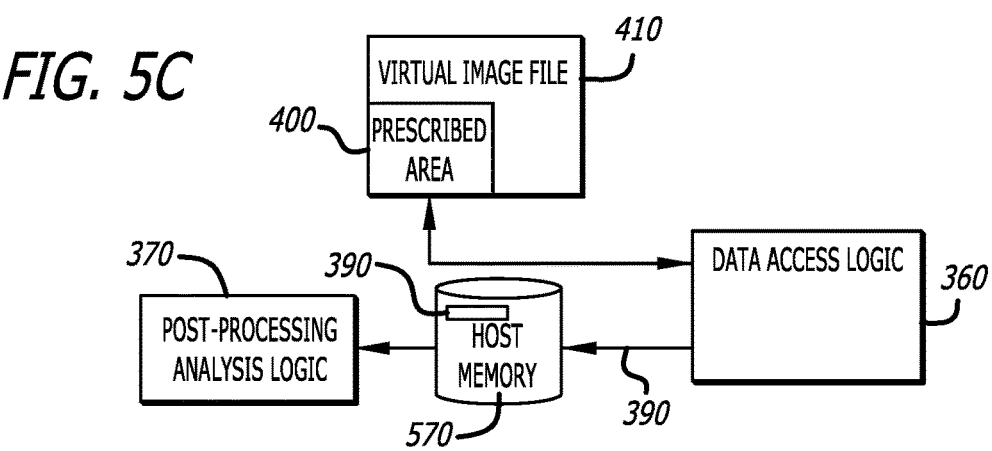

Referring now to FIGS. 5A-5C, a more detailed embodiment of the operational flow in the retrieval of post-analysis data, which is stored within the guest system and accessible to the host system, is described. Based on a rules-based analysis of data associated with monitored behaviors, the data availability logic determines whether the data corresponds to post-analysis data, and if so, places the post-analysis data within a prescribed area of a virtual image file. The prescribed area is accessible by the host system for extraction and subsequent processing by post-processing analysis logic.

As illustrated in FIG. 5A, as described above, the scheduler 350 provisions one or more guest systems $210_1$-$210_N$ for analysis of the object 190 based on meta information pertaining to that object 190. The meta information may include characteristics of the object 190 (e.g., object name, object type, creation date, and/or object size). Additionally, or in the alternative, the meta information may include characteristics of a second object being the source of the object 190, especially where the object 190 is a "dropped" file (i.e. a file created during processing of the second object). Characteristics of the second object may include, but are not limited or restricted to the name of the second object and/or an identifier of a network device that provided data including the second object (e.g., the media access control "MAC" address or Internet Protocol "IP" address).

More specifically, based on the meta information, the scheduler 350 creates the work order 380 that identifies the guest system(s) selected to conduct malware analysis of the object 190 and the software profile to be installed into the selected guest system(s). The software profile may include one or more guest OSes, one or more guest applications, and/or rules that govern processing of the object 190. The work order 380 further identifies a fixed storage location for the post-analysis data (offset, length).

After being provisioned, analysis logic 500 within the guest system $210_1$ conducts one or more analyses on the object 190, which is provided with the work order 190, to determine whether the object 190 is potentially associated with malware. Such analyses may include an optional static analysis and a dynamic analysis of the object 190. More specifically, as an optional feature, the analysis logic 500 may include static analysis logic 510 that, upon execution, analyzes features of the object 190 without execution of such object. As an illustrative example, the static analysis logic 510 may perform signature matching, including exploit signature checks, vulnerability checks or heuristics.

An "exploit signature" check involves a comparison of at least a portion of the object 190 with one or more pre-stored exploit signatures (pre-configured and predetermined attack patterns) from signature database (not shown). A "vulnerability signature" check involves an analysis to uncover deviations in messaging practices (e.g., non-compliance in communication protocols, message formats or ordering, and/or payload parameters including size). Lastly, heuristics are based on rules or policies as applied to the object 190 and, when performing heuristics, the static analysis logic 510 determines whether one or more portions of the object 190 is associated with an suspicious or malicious characteristic or conducts a determinative rule-based check using blacklist checking (comparison of information associated with known malware) or whitelist checking (comparison of information associated with known benign objects).

Additionally, or in the alternative, the analysis logic 500 includes dynamic analysis logic 520 that includes at least one VM that processes the object 190. Such processing may involve execution of the object 190 (where the object is an executable) or performing a series of operation on the object 190. During the processing of the object 190 within the guest system $210_1$, the event log $330_1$ monitors the behaviors of the object 190. If the event log $330_1$ determines the object 190 has generated additional objects, new data or produced a response that requires further post-processing analysis, the event log $330_1$ communicates locations of the guest file system containing the modified object or changed data to the data availability logic $340_1$.

As shown in FIG. 5B, operating within the guest system $210_1$, the data availability logic $340_1$ includes data procurement logic 530, behavior analysis logic 540, priority rule set 550 and storage logic 560. The data procurement logic 530 is communicatively coupled to the event log $330_1$ to obtain data associated with the monitored behaviors, namely data produced by certain activities (e.g., actions such as issuance of function, system or Application Programming Interface "API" calls, modifying/closing/opening files, creating/deleting files, changing registry values, etc.) and/or inactivities (e.g., inactions such as withholding display of a window, non-entry of keystrokes, etc.). The behavior analysis logic 540 analyzes the data associated with the monitored behaviors. Such analysis includes a runtime operation in prioritizing the data associated with the monitored behaviors based on the priority rule set 550 in order to determine whether the data constitutes post-analysis data when the priority level for the data exceeds a prescribed threshold. The priority rule set 550 may be static or the priority rule set may be periodically or aperiodically modified to account for changes in the types of malware attacks currently being conducted. Additionally, during runtime, the storage logic 560 operates in combination with the behavior analysis logic 580 by copying the post-analysis data to the prescribed area 400 in the virtual image file 410 in accordance with the offset and length parameters 420 and 430 originally provided in the work order 380.

More specifically, the behavior analysis logic 580 of the data availability logic $340_1$ may conduct a rule-based analysis of the behaviors, which includes prioritizing data associated with monitored behaviors that correspond to particular malware (payload) exceptions, memory exceptions, and/or artifact exceptions. As an illustrative example, during run-time, the behavior analysis logic 580 analyzes data associated with the monitored behaviors in accordance with a first set of rules 552 from priority rule set 550, which are configured to identify, through compliance and/or non-compliance with the first set of rules 552, what portions of the analyzed data are associated with malware exceptions (i.e., certain types of operations conducted by the object itself where the data associated with such operations are considered "post-analysis data"). Examples of data associated with monitored behaviors that correspond to particular malware exceptions may include, but are not limited or restricted to "modified" objects, namely newly created objects (e.g., an executable, script, text file, image, etc.) or altered objects (e.g., changes to registry value, stored setting, etc.).

Given that the prescribed area 400 of the virtual image file 410 of FIG. 4 is limited in size, the post-analysis data may be prioritized based on any combination of parameters. For instance, one parameter may include object type (e.g., determined by analysis of the object's extension). Another parameter may include when the malware exception occurred during the processing cycle (e.g., malware exceptions that occur during start-up may be assigned higher priorities than other periods during run-time). Yet another parameter may include the type of content being modified (e.g., creation of an executable file may be assigned a higher priority than creation of a text file). This priority may be considered when determining what data (e.g., the modified object and meta information associated with that object such as its source object, time of creation, etc.) should be part of the stored post-analysis data. Overwriting (substitution) of certain post-analysis data may be performed during runtime, especially when the prescribed area is reaching capacity and higher priority data needs to be made available to the host system.

As another illustrative example, during run-time, the behavior analysis logic 580 of the data availability logic $340_1$ analyzes the monitored behaviors in accordance with a second set of rules 554, which are configured to identify and prioritize memory exceptions, such as detection of a certain memory type (e.g., shell code), or modification of certain stored content within the guest system (e.g., registry value, setting, etc.). These memory exceptions may correspond to post-analysis data. Yet another illustrative example, during run-time, the behavior analysis logic 580 of the data availability logic $340_1$ analyzes the monitored behaviors in accordance with a third set of rules 556, which are configured to identify and prioritize artifact exceptions (e.g., occurrences of certain anomalous behaviors) as post-analysis data. One illustrative example of an artifact exception includes access/usage of a certain type of script (e.g., JavaScript) for example.

Thereafter, the storage logic 560 of the data availability logic $340_1$ controls the storage of the post-analysis data 390 in the prescribed area 400, which is a storage location within a virtual image file 410 stored in the guest system and its contents are made available to the host system 220 of FIG. 2. Herein, the data availability logic $340_1$ may make the post-analysis data 390 available to the data access logic 360 of FIG. 5C by copying the post-analysis data 390 to the prescribed area 400. Alternatively, in lieu of storing the post-analysis data 390 within the prescribed area 400, the storage logic 560 may store links, where the links provide accessibility to the post-analysis data 390 stored within one or more different storage areas. Hence, the size of the prescribed area 390 may be reduced, but storage of the post-analysis data at the different storage areas needs to be maintained for correct operability in malware detection.

Referring now to FIG. 5C, the data access logic 360 operates within the host system 220 and in cooperation with the data availability logic $340_1$. In response to a triggering event (e.g., termination of the work order in response to allocated processing time for the object has elapsed or crash of the guest system $210_1$, etc.), the data access logic 360 retrieves data from the prescribed area 400 of the virtual image file 410. After retrieval, the data access logic 360 determines what amount of the retrieved data corresponds to the post-analysis data stored by the data availability logic $340_1$, and stores only the actual post-analysis data 390 into memory 570 within the host system 220. The post-processing analysis logic 370 is communicatively coupled to the memory 570 within the host system 220 and conducts further malware analysis of the object to conclude, with better certainty, that the object 190 is malicious.

Figure 6A:
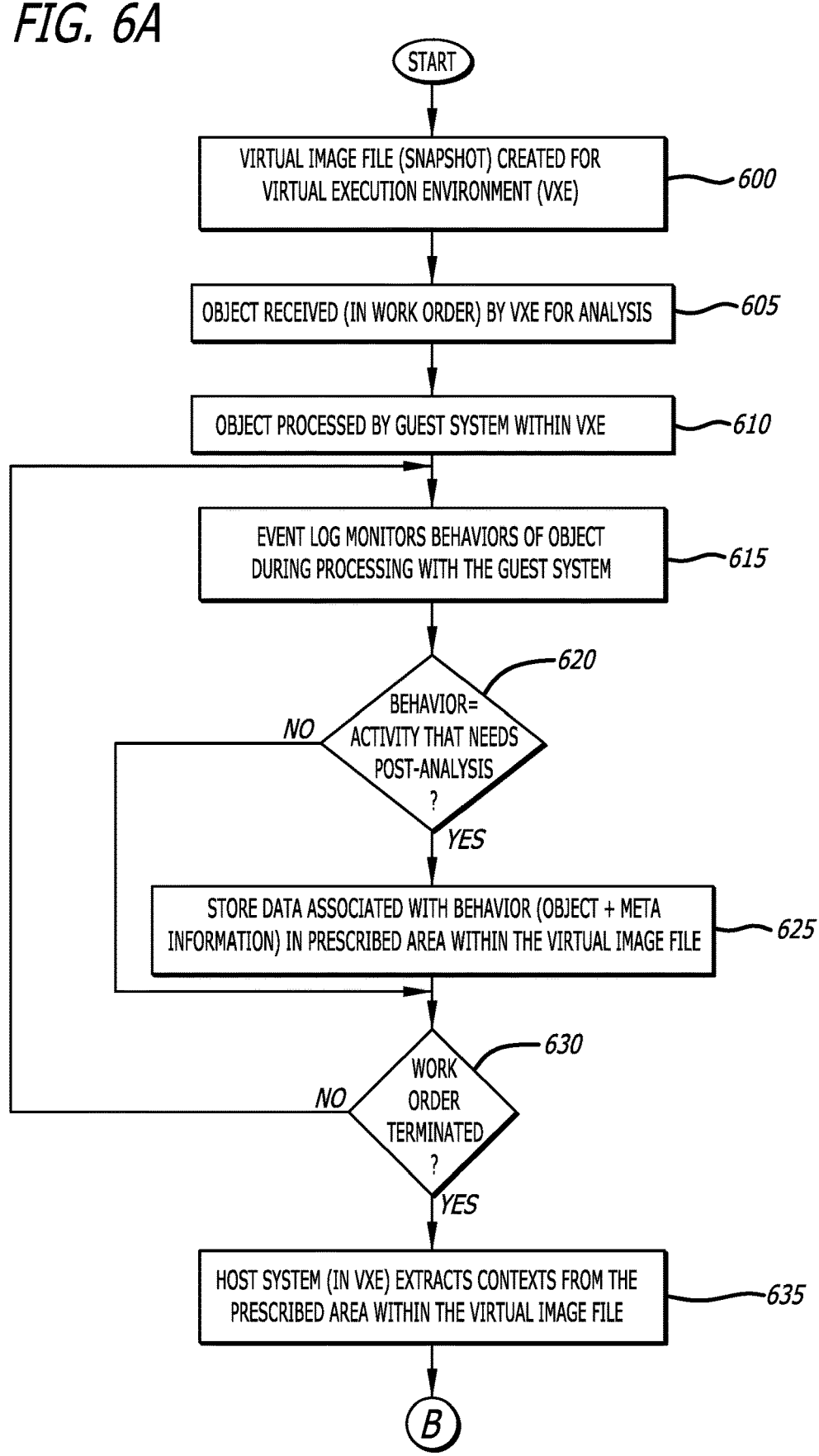
FIGS. 6A-6B are exemplary flowcharts of the operations conducted by the data extraction system logic of FIG. 3.
Figure 6B:
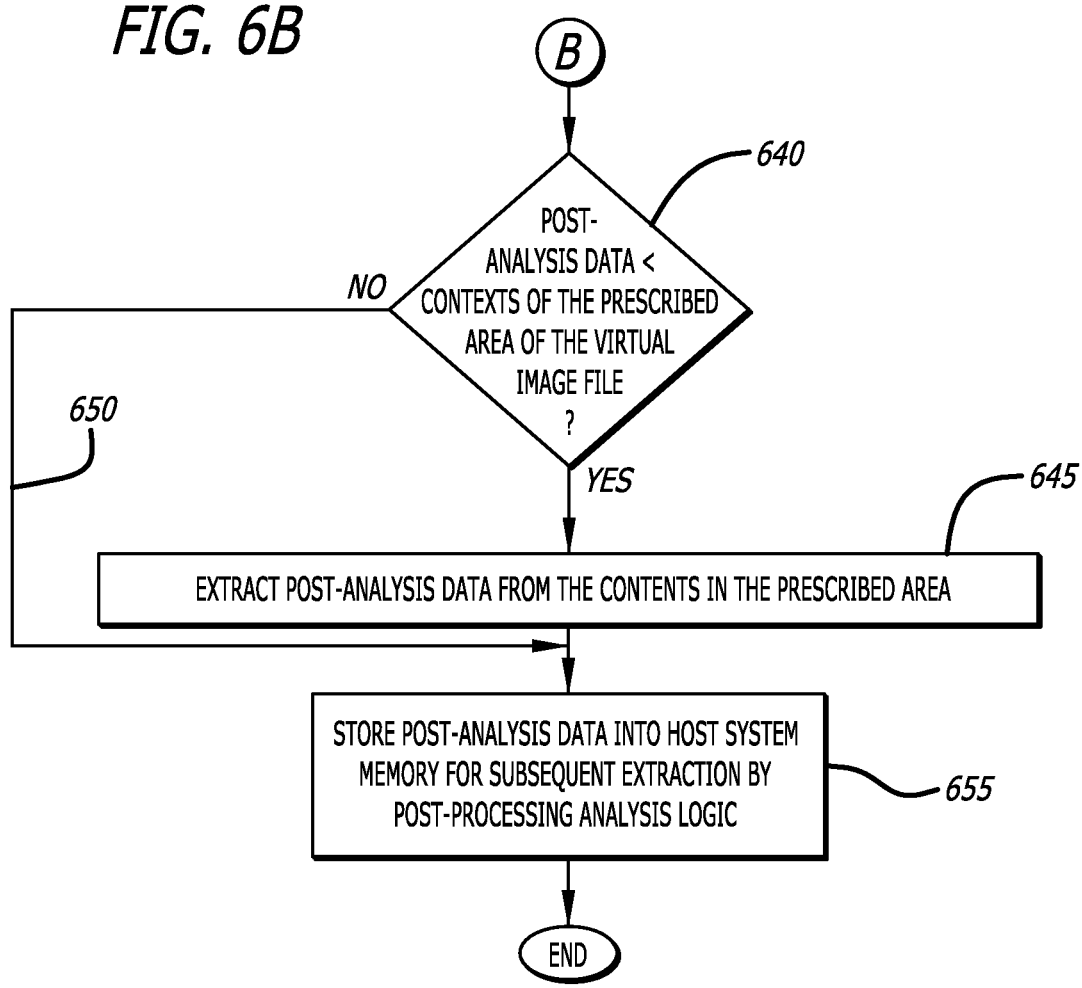

Referring to FIGS. 6A-6B, an exemplary flowchart of the operations conducted by the data extraction system of FIG. 3 is shown. Herein, a virtual image file corresponding to a guest system snapshot is created and used to configure the guest system of the network device 100 (block 600). An object (in a work order) is received by the virtual execution environment, namely the guest system, for analysis (block 605). Thereafter, the object is processed by the guest system within the virtual execution environment and the event log monitors behaviors of the object during such processing (blocks 610 and 615).

From the behaviors, a determination is made whether the monitored behavior corresponds to an activity that needs post-analysis such as creation of a new object for example (block 620). If so, this data (described above as "post-analysis data") is stored in a prescribed area within the virtual image file (block 625). If not, the data extraction systems operates to determine whether the work order has terminated, and if so, the host system (data access logic 360) extracts the contents within the prescribed area of the virtual image file (blocks 630 & 635).

More specifically, in response to an event that causes the host system to extract contents within the prescribed data, the data extraction system determines that the post-analysis data is lesser in size than the contents of the prescribed area (e.g., size of post-analysis data less than size of prescribed area), the post-analysis data is extracted from the contents of the prescribed area (blocks 640 and 645). If full, the contents of the prescribed area are retrieved by the host system (link 650). Thereafter, the post-analysis data is stored into memory of the host system for subsequent extraction by the post-processing analysis logic (block 655).

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method comprising:
monitoring behaviors of an object during processing within a guest system of a virtual machine;
storing data associated with the monitored behaviors;
conducting a rule-based analysis of the data associated with the monitored behaviors within the guest system to generate post-analysis data, wherein the rule-based analysis includes prioritizing the data associated with the monitored behaviors that correspond to one or more exceptions to produce the post-analysis data; and
storing the post-analysis data into a prescribed area of a virtual image file being an image of software running on the guest system, the prescribed area is accessible by both (i) data availability logic within the guest system and (ii) data access logic within a host system of the virtual machine, the data availability is configured to conduct the rule-based analysis of the data associated with the monitored behaviors and the data access logic is configured to extract the content within the prescribed area of the virtual image file and filter the content within the prescribed area to recover the data associated with the monitored behaviors that correspond to an exception of the one or more exceptions, wherein a priority assigned to data associated with the monitored behaviors is considered when determining what data is to be stored as part of the post-analysis data.

2. The computerized method of claim 1, wherein an exception of the one or more exceptions corresponds to a malware exception that includes a newly created object or an altered object that causes a change to a registry value.

3. The computerized method of claim 1, wherein an exception of the one or more exceptions includes a memory exception that comprises a certain memory type or a modification of certain stored content within the guest system.

4. The computerized method of claim 1, wherein an exception of the one or more exceptions includes an artifact exception that identifies an occurrence in certain anomalous behaviors.

5. The computerized method of claim 1, wherein the post-analysis data is a subset of the data associated with the monitored behaviors.

6. The computerized method of claim 1, wherein an exception of the one or more exceptions corresponds to a malware exception that includes a newly created object or an altered object that causes a change in a stored setting.

7. A network device comprising:
a processor; and
a non-transitory storage medium communicatively coupled to the processor, the non-transitory storage medium comprises
a virtual machine that, upon execution by the processor, is configured to process an object, the virtual machine includes a guest system and a host system,
event monitoring logic that, upon execution by the processor, is configured to monitor behaviors of the object during processing within the guest system of the virtual machine,
data availability logic that, upon execution by the processor, is configured to conduct a rule-based analysis of data associated with the behaviors monitored during processing of the object by the event monitoring logic to control storage of the data, the rule-based analysis to determine what data corresponds to an exception, to assign priority for data associated with the monitored behaviors and, based at least in part on the assigned priority, to store the data corresponding to the exception into a prescribed area of a virtual image file that constitutes an image of software running on the guest system and accessible to the host system.

8. The network device of claim 7, wherein the non-transitory storage medium further comprises data access logic maintained within the host system of the virtual machine, the data access logic having access to the prescribed area of the virtual image file.

9. The network device of claim 8, wherein the data access logic to extract content within the prescribed area of the virtual image file and filter the content within the prescribed area to recover the data associated with the monitored behaviors that correspond to the exception.

10. The network device of claim 7, wherein the exception includes a malware exception that includes a newly created object or an altered object that causes (i) a change to a registry value, or (ii) a change in a stored setting.

11. The network device of claim 7, wherein the exception includes a memory exception that comprises a certain memory type or a modification of certain stored content within the guest system.

12. The network device of claim 7, wherein the exception includes an artifact exception that identifies an occurrence in certain anomalous behaviors.

13. The network device of claim 7 corresponds to a virtual electronic device in which the processor of the virtual electronic device is based on a hardware processor.

14. A network device comprising:
a processor; and
a non-transitory storage medium communicatively coupled to the processor, the non-transitory storage medium comprises
event monitoring logic that, upon execution by the processor, is configured to monitor behaviors of an object during processing within a guest system of a virtual machine, and
data extraction system logic that, upon execution by the processor, is configured to (i) conduct a rule-basis analysis of data associated with the monitored behaviors of the object, (ii) prioritize the data associated with the monitored behaviors that correspond to one or more exceptions to produce post-analysis data, and (iii) store the post-analysis data, being the data that is associated with the monitored behaviors and corresponds to an exception of the one or more exceptions, into a prescribed area of a virtual image file that constitutes an image of software running on the guest system, the prescribed area of the virtual image file being accessible by logic within the guest system of the virtual machine and logic within a host system of the virtual machine.

15. The network device of claim 14 further comprising software that, upon execution, configures the virtual machine for analysis of the object to determine whether a probability of the object being malware exceeds a threshold.

16. The network device of claim 15, wherein the data extraction system logic further comprises data access logic maintained within the host system of the virtual machine, the host system having access to the prescribed area of the virtual image file.

17. The network device of claim 16, wherein the data access logic to extract content within the prescribed area of the virtual image file and filter the content within the prescribed area to recover the data associated with the monitored behaviors that correspond to the exception.

18. The network device of claim 16, wherein the exception includes a malware exception that includes a newly created object or an altered object that causes (i) a change to a registry value, or (ii) a change in a stored setting.

19. The network device of claim 14, wherein the exception includes a memory exception that comprises a certain memory type or a modification of certain stored content within the guest system.

20. The network device of claim 14, wherein the exception includes an artifact exception that identifies an occurrence in certain anomalous behaviors.

21. The network device of claim 14 corresponds to a virtual electronic device in which the processor of the virtual electronic device is based on a hardware processor.

\* \* \* \* \*